(No Model.)

H. BISHOP.
Perch for Bird Cages.

No. 230,993. Patented Aug. 10, 1880.

Witnesses,
D. C. Clark.
D. L. H. Barclay.

Inventor,
HENRY BISHOP.

by
R. D. Williams,
Attorney.

UNITED STATES PATENT OFFICE.

HENRY BISHOP, OF BALTIMORE, MARYLAND.

PERCH FOR BIRD-CAGES.

SPECIFICATION forming part of Letters Patent No. 230,993, dated August 10, 1880.

Application filed July 6, 1880. (No model.)

*To all whom it may concern:*

Be it known that I, HENRY BISHOP, of Baltimore city, State of Maryland, have invented certain new and useful Improvements in Perches for Bird-Cages; and I hereby declare the same to be fully, clearly, and exactly described as follows, reference being had to the accompanying drawings, in which—

Figure 1:
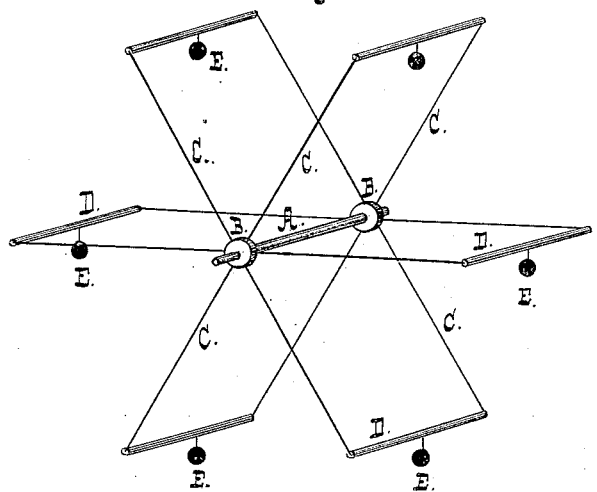
Figure 2:
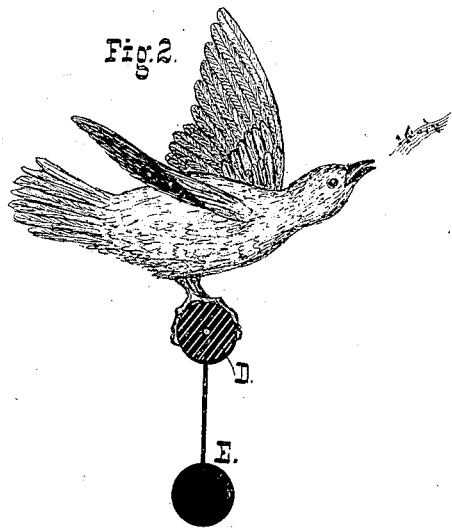

Figure 1 is a perspective view of the perch, and Fig. 2 is a transverse sectional view of one of its parts.

My present invention is an improvement upon that for which Letters Patent of the United States were granted to me June 8, 1880, and numbered 228,438, in which is shown a reel having a number of revolving perches, the said reel being mounted upon suitable bearings in the cage and adapted to revolve as the birds alight upon the perches. The perches must of necessity be made to revolve freely with reference to the reel in order to enable the birds to maintain their footing as the reel turns, but even then they are observed to be continually tilting and balancing. To obviate this I have devised a perch which automatically maintains itself in the same position by reason of a counterpoise, and therein my present invention may be said to broadly consist. Specifically it is embodied in combinations that are made the subject of the claim.

In the accompanying drawings, A is the central shaft, having hubs B B, from which radiate a number of spokes, C C C, connected at their outer ends by perches D D D, which are susceptible of free revolution with reference to the main reel. Each perch is provided with a counterpoise, E, which maintains it in a vertical position as the reel revolves.

The advantage is obvious. The birds maintain their footing on the perches even when the reel is revolving rapidly as readily as if the perches were stationary.

The reels are adapted for use in that class of large cages containing a number or "happy family" of birds, and during the day-time are continually turning. At night, in order to enable the birds to roost quietly upon the perches and not be awakened by the revolution of the reel as a bird alights upon or leaves the perch, it has heretofore been necessary to lock the reel. With my improved perch this necessity no longer exists, as the steadiness of the perches enables the birds to roost and sleep though the reel revolves.

What I claim is—

1. A revolving reel having a swiveling counterpoised perch, as set forth.

2. In combination with the central shaft having radial arms, the counterpoised perches connecting the outer ends of the arms, as set forth.

HENRY BISHOP.

Witnesses:
R. D. WILLIAMS,
W. A. BERTRAM.